Sept. 8, 1925.  F. THARALDSEN  1,553,011
APPARATUS FOR TREATING MATERIALS CONTAINING ZINC IN THE METALLIC STATE
Filed Dec. 23, 1922
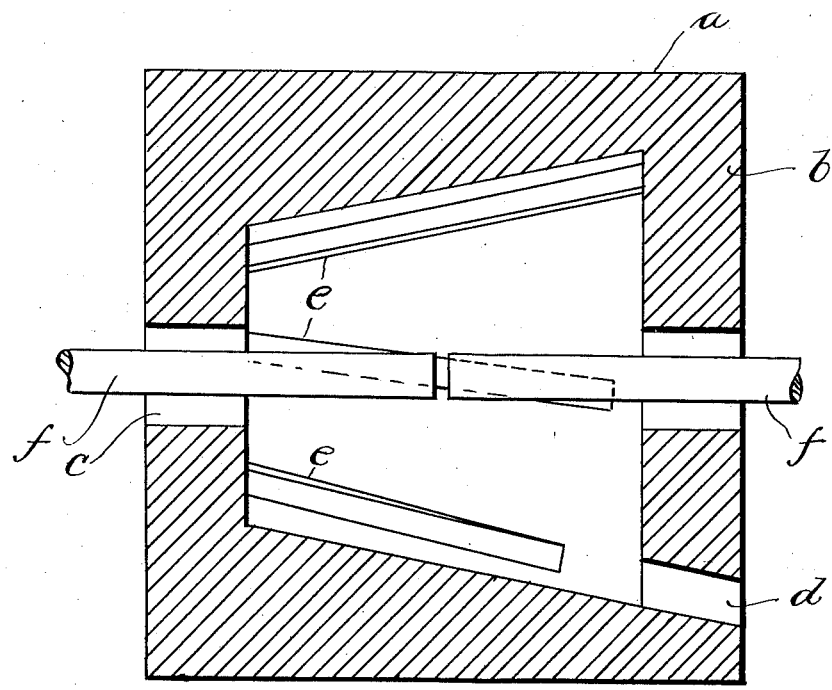
Inventor
Filip Tharaldsen
by Henry Orth Jr.

Patented Sept. 8, 1925.

1,553,011

UNITED STATES PATENT OFFICE.

FILIP THARALDSEN, OF BESTUM, NEAR CHRISTIANIA, NORWAY.

APPARATUS FOR TREATING MATERIALS CONTAINING ZINC IN THE METALLIC STATE.

Application filed December 23, 1922. Serial No. 608,782.

*To all whom it may concern:*

Be it known that I, FILIP THARALDSEN, a citizen of Norway, residing at Bestum, near Christiania, Norway, have invented certain new and useful Improvements in Apparatus for Treating Materials Containing Zinc in the Metallic State, of which the following is a specification.

My invention relates to apparatus for the treatment of materials containing metallic zinc, such as impure zinc, zinc scrap, blue powder and the like, for the purpose of gaining their metal contents as liquid zinc.

To this end I introduce the materials into a rotating drum, the inside lining of which is provided with corrugations or projections of any sort such as nubs, projecting ridges and the like or the inside lining of the drum is given a wavy surface. During the rotation of the drum these projections will work the materials mechanically, in exerting a pressure on the metallic particles and facilitate the coalescence of liquid metal.

The projections on the inside lining may be arranged in different ways. The nubs may be distributed irregularly over the interior surface or may be arranged in ranges running alongside the drum in straight or for instance helical lines. When projecting ridges are used, these may likewise run along straight or curved lines on the lining. The drum may have the shape of a cylinder or a cone. Preferably the outer casing of the drum is made cylindrical and the lining is so arranged that the interior has a conical form. The liquid metal will then collect at the base of the cone where an opening is provided for tapping the liquid zinc.

The drum may be charged with heated zinc materials, or heating devices may be provided in the interior of the drum.

My invention is illustrated in the annexed drawing which represents a longitudinal section of an embodiment of the drum preferably used. According to the drawing the drum consists of a sheet-iron casing *a* with a lining *b* of suitable heat resisting material, which gives the interior of the drum a conical form. The drum has an opening *c* for charging the materials and an opening *d* for removing the products obtained, i. e. partly molten zinc, partly oxidized materials such as zinc-ashes and the like, that remain as residue from the operation. After the molten products have been tapped the unmelted residues are raked out, and a fresh operation is started. The process is then worked intermittently. The drawing shows projecting ridges *e* running along the sides of the drum. The ridges that run towards the tap-hole are shorter than the others, so that a considerable bath of metal may collect inside the tap-hole and be withdrawn at one time. The charge opening and the removal opening are naturally shut during the rotation of the drum. According to the drawing the drum is heated by radiation from an electric arc, striking between electrodes *f*. However the heating may also be effected by resistances.

I claim:

1. An apparatus for treating materials containing zinc in the metallic state, comprising a rotary container having a heat resisting lining and projections of heat resisting material on said lining adapted to exert pressure on the zinc containing material being treated.

2. An apparatus for treating blue powder comprising a rotary drum having an inside lining, and projecting nubs on said lining adapted to exert pressure on the material being treated.

3. An apparatus for treating blue powder comprising a rotary drum having an inside lining, and projecting nubs arranged in ranges on said lining.

4. An apparatus for treating blue powder comprising a rotary drum having an inside heat resisting lining, and projecting ridges of heat resisting material running longitudinally in said lining.

5. An apparatus for treating blue powder comprising a rotary drum having an inside lining, and projecting ridges running in helices on said lining.

6. An apparatus for treating blue powder comprising a rotary conical drum having an inside lining, and projecting ridges running longitudinally on the lining.

7. An apparatus for treating blue powder comprising a rotary cylindrical drum having an inside lining so arranged as to give the interior of the drum a conical shape, and projecting ridges running longitudinally on the lining.

8. An apparatus for treating blue powder comprising an electrically heated rotary drum having an inside lining so arranged as to give the interior of the drum a conical shape and projections on the lining of said drum.

9. An apparatus for treating blue powder comprising a rotary drum having an inside lining so arranged as to give the interior of the drum a conical shape, a charging opening for material to be treated, a removal opening for the products formed, projecting longitudinal ridges in said lining, the ridges that run towards said removal opening being shorter than the other ridges.

In witness whereof I affix my signature.

FILIP THARALDSEN.